United States Patent
Chou et al.

(10) Patent No.: US 9,178,240 B2
(45) Date of Patent: Nov. 3, 2015

(54) SYSTEM AND PROCESS FOR ALUMINIZATION OF METAL-CONTAINING SUBSTRATES

(71) Applicants: Yeong-Shyung Chou, Richland, WA (US); Jeffry W. Stevenson, Richland, WA (US)

(72) Inventors: Yeong-Shyung Chou, Richland, WA (US); Jeffry W. Stevenson, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 262 days.

(21) Appl. No.: 13/966,073

(22) Filed: Aug. 13, 2013

(65) Prior Publication Data

US 2014/0048183 A1    Feb. 20, 2014

Related U.S. Application Data

(60) Provisional application No. 61/683,489, filed on Aug. 15, 2012.

(51) Int. Cl.

| | |
|---|---|
| *C23C 8/10* | (2006.01) |
| *H01M 8/12* | (2006.01) |
| *C23C 8/12* | (2006.01) |
| *C23C 26/00* | (2006.01) |
| *H01M 8/02* | (2006.01) |

(52) U.S. Cl.
CPC .............. *H01M 8/1246* (2013.01); *C23C 8/10* (2013.01); *C23C 8/12* (2013.01); *C23C 26/00* (2013.01); *H01M 8/0208* (2013.01); *H01M 8/0228* (2013.01); *H01M 8/0273* (2013.01); *H01M 2008/1293* (2013.01)

(58) Field of Classification Search
CPC ............ C23C 8/10; C23C 8/12; C23C 26/00; H01M 8/0228; H01M 8/0208; H01M 8/0273; H01M 8/1246; H01M 2008/1293
See application file for complete search history.

(56) References Cited

U.S. PATENT DOCUMENTS

| | | |
|---|---|---|
| 2,484,118 A | 10/1949 | Reynolds |
| 2007/0248868 A1 | 10/2007 | Haltiner, Jr. et al. |

FOREIGN PATENT DOCUMENTS

| | | |
|---|---|---|
| DE | 4410711 C1 | 9/1995 |
| JP | H03287755 A | 12/1991 |

OTHER PUBLICATIONS

International Search Report/Written Opinion for International Application No. PCT/US2013/0548569, International Filing Date Aug. 14, 2013, Date of Mailing Dec. 12, 2013.

*Primary Examiner* — Lois Zheng
(74) *Attorney, Agent, or Firm* — James D. Matheson

(57) ABSTRACT

A system and method are detailed for aluminizing surfaces of metallic substrates, parts, and components with a protective alumina layer in-situ. Aluminum (Al) foil sandwiched between the metallic components and a refractory material when heated in an oxidizing gas under a compression load at a selected temperature forms the protective alumina coating on the surface of the metallic components. The alumina coating minimizes evaporation of volatile metals from the metallic substrates, parts, and components in assembled devices during operation at high temperature that can degrade performance.

14 Claims, 2 Drawing Sheets

SYSTEM AND PROCESS FOR ALUMINIZATION OF METAL-CONTAINING SUBSTRATES

CROSS REFERENCE TO RELATED APPLICATIONS

This is a non-provisional application that claims priority from U.S. Provisional Patent Application No. 61/683,489 filed 15 Aug. 2012 entitled "Process for Metalizing Surfaces In-Situ", which reference is incorporated herein in its entirety.

STATEMENT REGARDING RIGHTS TO INVENTION MADE UNDER FEDERALLY-SPONSORED RESEARCH AND DEVELOPMENT

This invention was made with Government support under Contract DE-ACO5-76RLO1830 awarded by the U.S. Department of Energy. The Government has certain rights in the invention.

FIELD OF THE INVENTION

The present invention relates generally to systems and methods for coating metals. More particularly, the invention relates to a system and processes for aluminizing metallic substrates and components.

BACKGROUND OF THE INVENTION

Oxidation resistant ferritic stainless steels are considered to be promising candidate materials for interconnects and cell frames in high temperature electrochemical devices including solid oxide fuel cells (SOFC) and solid oxide electrolysis cells (SOEC) interconnect applications in SOFC stacks operating in the intermediate temperature range of from about 650° C. to about 850° C. due to their thermal expansion match with other stack materials (e.g., anode-supported cells and seals), their ability to form a conductive oxide scale, and their relatively low cost. However, these metals require a protective coating to block evaporation of chromium (Cr), an important constituent of the metals. Without the protective coating, volatile chromium (Cr) species can evaporate and poison the electrochemical cell thereby degrading the electrochemical performance over time. Aluminization is considered a viable solution to address the evaporation problem in ferritic steel components. Aluminization is conventionally performed with such high-temperature processes as vapor phase deposition and pack cementation. However, these conventional approaches must be performed on metallic components before being inserted in the stack during the stack assembly, and often involve expensive aluminum precursor materials. In some cases, an additional high-temperature heat treatment may be needed to re-flatten individually aluminized components to eliminate any warping that occurred during the aluminization process. As will be appreciated by those of ordinary skill in the art, extra processing steps can increase manufacturing costs. Accordingly new processes are needed that can provide aluminization of metallic parts economically, efficiently, and without the need for these heat treatments and/or expensive raw material. The present invention addresses these needs.

SUMMARY OF THE INVENTION

The present invention includes a method for aluminizing metal-containing substrates. The method may include compressing an aluminum foil of a selected thickness between one or more metal-containing substrates and a refractory material of a selected thickness with at least one compression component under a selected compression load in an oxidizing gas at a selected temperature for a time sufficient to form an aluminum oxide coating layer on the surface of the metal-containing substrates. The aluminum oxide coating layer on the surface of the metal-containing substrates prevents, reduces, and/or minimizes release of volatile metals including chromium (Cr) from the metal-containing substrates that can reduce performance of the device during operation at an operation temperature, as compared to metal-containing substrates that do not include the aluminum oxide coating layer. The aluminum oxide coating layer does not spall from the surface of the metal-containing substrates in a device during operation at the operating temperature of the device. The present invention eliminates need for separate heat treatments or post-firing heat and cleaning treatments. As such, the process is more economical and more efficient than conventional coating technologies.

The present invention also includes a system for aluminizing a surface of metal-containing substrates. The system may include: a compression assembly that includes at least one compression component configured to compress an aluminum foil of a selected thickness between one or more metal-containing substrates and a refractory material of a selected thickness under a selected compression load in an oxidizing gas at a selected temperature for a time sufficient to form an aluminum oxide coating on the surface of the metal-containing substrates. Metal-containing substrates may include a metal alloy such as ferritic stainless steel, but metal-containing substrates are not limited. In some applications, metal-containing substrates may be components of high temperature electrochemical devices such as solid oxide fuel cells.

In some applications, the surface of the metal-containing substrates may be a flat surface. In some applications, the surface of the substrate or metal component may be other than a flat surface.

The aluminum (Al) foil may be of various selected thicknesses. In various applications, thickness of the aluminum foil may be between about 0.001 mm and about 0.5 mm. In some applications, the aluminum foil may include a thickness of less than about 25 μm (microns).

Aluminization may be performed absent annealing at a selected temperature.

The refractory material of the present invention may be a sheet of mica. Thickness of the mica sheet is not limited. In some applications, the sheet of mica may include a thickness of, e.g., 0.3 mm (0.012 inches).

Aluminization of the metal-containing substrates may be performed within an assembled device in-situ. Devices are not limited. Exemplary devices are high temperature electrochemical devices including, e.g., solid oxide fuel cells (SOFCs), solid oxide electrolyzer cells (SOECs), oxygen membranes, and other devices. In some applications, the assembled device may be a stack assembly of an electrochemical device and the metal-containing substrates may be components of the stack assembly including, e.g., interconnects, frames of ceramic cells, or combinations of these components. In some applications, aluminization of metal-containing components of an electrochemical device including interconnects and cell frames may be performed in-situ, e.g., during stack fabrication heat treatment after assembly of the stack components. Here, the aluminizing heat treatment may be identical to the heat treatment used to bond individual stack components together after a standard stack assembly.

The instant approach eliminates need for a preliminary aluminizing heat treatment of individual metallic components prior to stack assembly.

In some applications, aluminization of the metal-containing components of the electrochemical device may be performed prior to assembly in the electrochemical device. For example, aluminization may be performed on individual interconnects and cell frames of an electrochemical device prior to assembling the individual components in a stack assembly.

Compression components of the compression assembly may include compression plates constructed of a high-temperature refractory material including ceramic blocks or metals that deliver the compression load uniformly through the aluminum foil to the metal-containing substrates.

In some applications, compression loads may be provided by high-temperature compression discs, or external high-load compression springs. Compression loads may be delivered to the assembled device with such devices as high-temperature compression discs, or external high-load compression springs. In various applications, the compression load may be greater than or equal to about 6800 Newtons per square meter ($N/m^2$). The compression load may be applied for a time greater than or equal to about 5 minutes at the selected temperature.

Heating of the metal-containing substrates may be performed, e.g., in a furnace or a heater. Heating may include diffusing aluminum from the aluminum foil into the surface of the metal-containing substrate, resulting in the formation of the aluminum oxide coating layer on the surface of the metal-containing substrates. Heating temperature may be selected between about 660° C. and about 1200° C. In some applications, reaching the selected heating temperature may include a heating rate between about 1° C. per minute and about 10° C. per minute. Oxidizing gases may include air, or gas mixtures that include air.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION

A system and method are detailed for coating metallic parts and metal-containing substrates with a protective alumina layer that eliminates need for post-coating treatments including, e.g., post-coating firing or other post treatment steps. The process is simple, efficient, and economical compared with conventional aluminization processes. The following description includes a preferred best mode of one embodiment of the present invention. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims. Therefore the present description should be seen as illustrative and not limiting.

Figure 1:
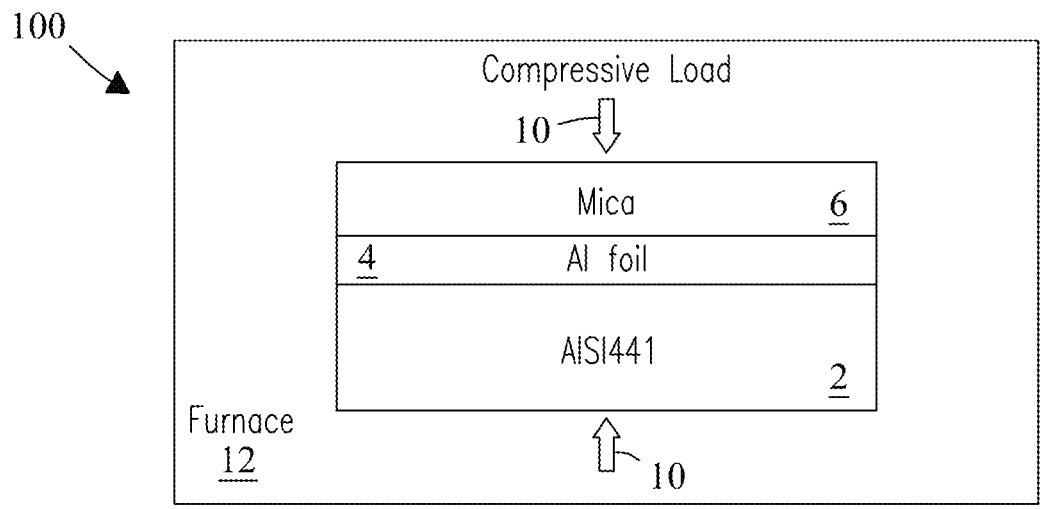
FIG. 1 shows a system for aluminizing metal-containing parts and components, according to one embodiment of the present invention.

FIG. 1 shows a compression assembly 100 for aluminizing metal-containing parts and components. "Aluminization" as the term is used herein means to coat metallic surfaces of metal-containing substrates with an aluminum oxide (alumina) coating. Compression assembly 100 includes aluminum foil 4 of a selected thickness that is sandwiched between a metal-containing substrate 2 composed of a selected metal or metal alloy, and a refractory 6 composed, e.g., of a sheet of mica. Thickness of mica sheet 6 and aluminum foil 4 are not limited. In some embodiments, substrate 2 may include, or be composed of, e.g., ferritic stainless steel (e.g., grade AISI441 ferritic stainless steel) or another suitable metal. Compression assembly 100 may include a compression plate 8 that maintains contact between aluminum foil 4 and the surface of substrate 2 and further delivers a compression load 10 directly and uniformly through aluminum foil 4 that facilitates aluminization of the surface of substrate 2. The aluminum (Al) foil may include selected thicknesses. In various embodiments, the aluminum foil may include a thickness of between about 0.001 mm and about 0.5 mm. In some embodiments, the aluminum foil may include a thickness of less than about 25 μm (microns).

Compression assembly 100 can deliver a compression load required for aluminization of the components in electrochemical devices (e.g., SOFC devices) and simultaneously serve as a hybrid compression seal for operation of the electrochemical devices. In some embodiments, the compression load may be greater than or equal to about 6800 Newtons/$m^2$. Compression loads may be provided by components in the electrochemical device assembly such as high-temperature compression discs, or via such devices as external high-load compression springs. However, all compression devices as will be implemented by those of ordinary skill in the art in view of the disclosure are within the scope of the invention. No limitations are intended. In some embodiments, the compression load may be applied for a time greater than or equal to about 5 minutes at the selected temperature.

In an exemplary embodiment, the mica sheet 6 may include a thickness of about 0.012 inches (0.3 mm). But, thickness dimensions are not intended to be limited. When assembled into the electrochemical device assembly, mica sheet 6 may be heated at a temperature of, e.g., 550° C. for a time sufficient to burn off organic binders in the mica sheet that may be detrimental to operation of the electrochemical device in which it is introduced. Times for removing binders are not limited. Typical times for removing organic binders may be up to about 2 hours, but times and temperatures are not intended to be limited. Alternatively, mica sheets free of organic binders may be employed.

Compression assembly 100 may be heated, e.g., in a furnace or heater 12 in an oxidative gas such as air at the selected aluminization temperature for a time sufficient to aluminize the surface of the substrate 2. Temperatures for aluminization are not limited. In some embodiments, aluminization temperature may be, e.g., about. 900° C. In various embodiments, aluminization temperature may be between about 660° C. and about 1000° C. In some embodiments, heating the substrate (including parts or components) to the aluminization temperature may include a heating rate of between about 1° C. per minute and about 10° C. per minute.

Times to effect aluminization are also not limited. In some embodiments, aluminization can be completed by heating substrate for a time greater than or equal to about 5 minutes at the selected aluminization temperature. In some embodiments, aluminization can be completed by heating the substrate at the aluminization temperature for about 2 hours on average.

Aluminum oxide coatings on aluminized metallic substrates obtained in concert with the present invention minimize release of volatile metal species including chromium (Cr) from metallic substrates in assembled electrochemical devices during operation at elevated temperatures that can poison and degrade performance in these electrochemical devices and cells.

In-Situ Aluminization in Assembled Devices

Figure 2:
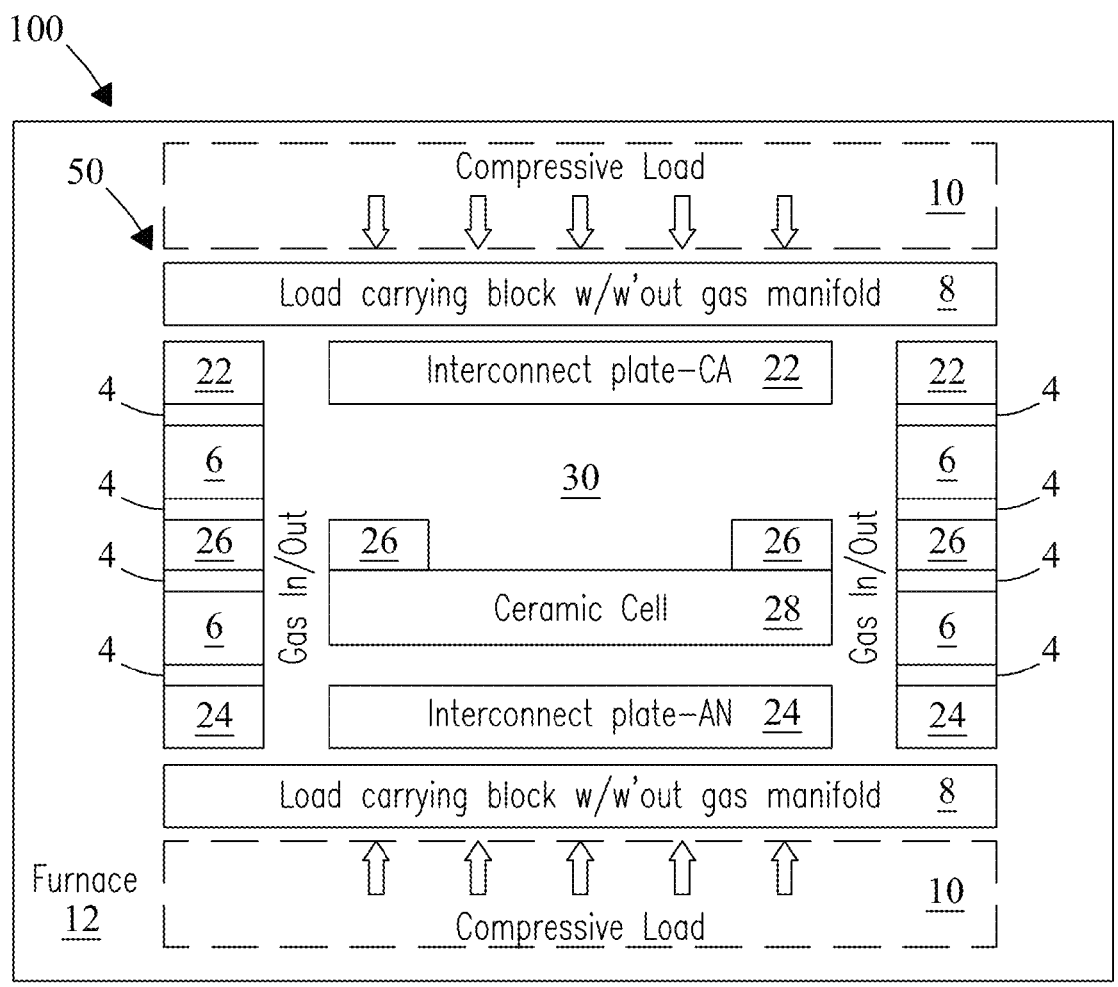
FIG. 2 is a cross-sectional view of a system for aluminizing metal-containing substrates of an assembled device in-situ, according to an embodiment of the present invention.

The present invention can be used to aluminize metal-containing substrates in assembled devices in-situ including metallic parts that contain stainless steel or other metal alloys comprising chromium (Cr) in high temperature electrochemical devices. Devices are not limited. Exemplary devices include high temperature electrochemical devices. High temperature electrochemical devices include, but are not limited to, e.g., solid oxide fuel cells (SOFCs), solid oxide electrolyzer cells (SOECs), oxygen membranes, and other devices. While aluminization of flat substrates, parts, and components is described hereafter, the invention is not limited to flat substrates, parts, and components only. FIG. 2 shows a cross-sectional view of a compression assembly 100 configured for aluminizing metallic components of an exemplary planar solid oxide fuel cell (SOFC) 50 in-situ, in accordance with the present invention. The instant configuration also thermalizes device components in preparation for thermal cycling during operation of SOFC 50. As shown in the figure, aluminum (Al) foil 4 may be applied to surfaces of cathode interconnect 22, anode interconnect 24, window (stack) frame 26, and/or other metallic components of SOFC 50. In the instant embodiment, mica paper 6 may be positioned between respective sheets or layers of aluminum foil 4 positioned on the cathode side of ceramic (electrochemical) cell 28 to maintain good contact between the layers of aluminum foil 4 on an inner side of interconnect 22 and window frame 26 to maintain good contact between the layers of aluminum foil 4, and on a side of interconnect 24 and window frame 26 on the anode side of ceramic (electrochemical) cell 28, respectively. Compression (load carrying) plates 8 may be positioned on an exterior side of cathode interconnect 22 and an exterior side of anode interconnect 24 that delivers compression load 10 to respective sides of electrochemical device 50 mounted in compression assembly 100. Metallic components of electrochemical device 50 may be aluminized by introducing an oxidizing gas through a gas manifold 30 that is coupled to compression block 8 on the cathode interconnect 22 side of ceramic cell 28 and/or on the anode interconnect 24 side of ceramic cell 28. Gas manifold 30 delivers oxidizing gas to metallic components and aluminum foil 4 in electrochemical (e.g., SOFC) device 50 during heating of compression assembly 100 in furnace 12 at conditions that form the protective alumina coating layer on the surfaces of components in the electrochemical device 50.

Figure 3:
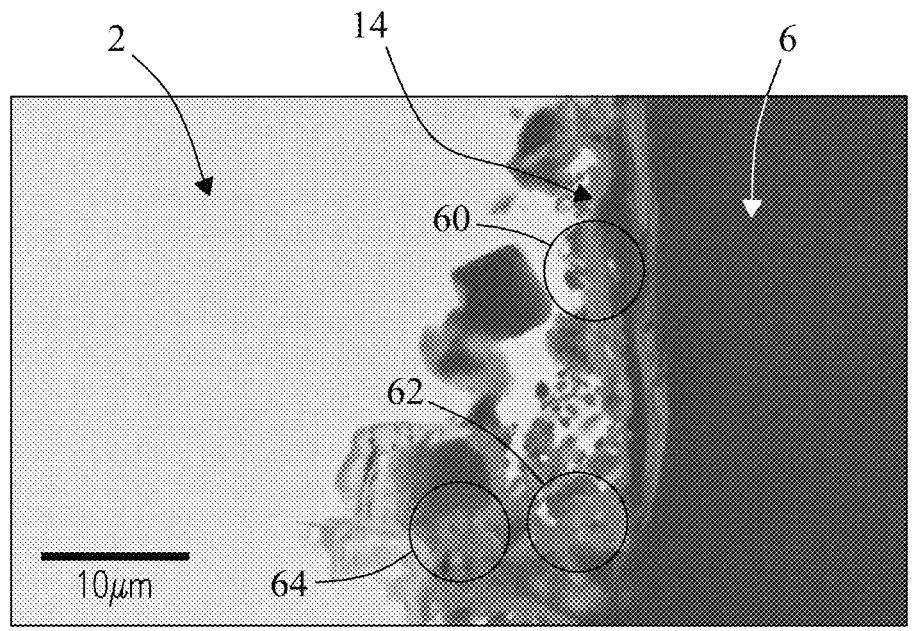
FIG. 3 is an electromicrograph showing an alumina coating layer formed on a surface of a metal-containing substrate in accordance with the present invention.

FIG. 3 is a scanning electron micrograph (SEM) showing an exemplary alumina coating (protection) layer 14 formed on an exemplary alloy (AISI441) substrate 2 in accordance with the present invention. In the figure, three spots (Spot #1-1) 60, (Spot #2-1) 62, (Spot #3-1) 64 of substrate 2 were assayed and subjected to chemical analysis by Energy Dispersion Spectroscopy (EDS). TABLE 1 lists results of the chemical analyses.

TABLE 1

Chemical Analysis Results for Selected Spots of an aluminized surface analyzed by Energy Dispersion Spectroscopy (EDS) in accordance with the present invention.

| Element | Spot #1-1 (Atom %) | Spot #2-1 (Atom %) | Spot #3-1 (Atom %) |
|---|---|---|---|
| O | 59.73 | 62.03 | 57.72 |
| Mg | 0.73 | — | — |
| Al | 29.14 | 32.64 | 37.46 |
| Si | 5.27 | 0.52 | 0.50 |
| K | 0.15 | — | — |
| Cr | 0.74 | 1.24 | 1.14 |
| Fe | 4.24 | 3.57 | 3.19 |

Figure 4:
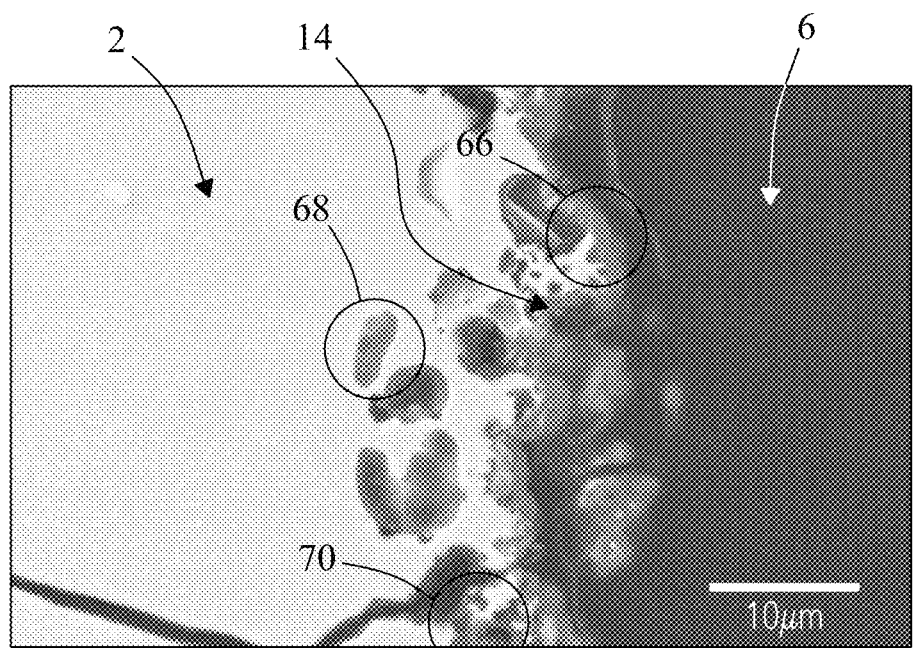
FIG. 4 is an electromicrograph showing an alumina coating layer formed on a surface of another metal-containing substrate in accordance with the present invention.

FIG. 4 is a scanning electron micrograph (SEM) showing an exemplary alumina protection layer 12 formed on another (AISI441) alloy substrate 2 in accordance with the present invention. Three spots (Spot #2-1) 66, (Spot #2-2) 68, (Spot #3-2) 70 of substrate 2 shown in the figure were assayed and subjected to chemical analysis by Energy Dispersion Spectroscopy (EDS). TABLE 2 lists results.

TABLE 2

Chemical Analysis Results for Selected Spots of an aluminized surface analyzed by Energy Dispersion Spectroscopy (EDS) in accordance with the present invention.

| Element | Spot #1-2 (Atom %) | Spot #2-2 (Atom %) | Spot #3-2 (Atom %) |
|---|---|---|---|
| O | 54.88 | 55.61 | 44.51 |
| Al | 37.55 | 34.58 | 32.97 |
| Si | 0.62 | 0.39 | 0.56 |
| Nb | — | — | 0.36 |
| Cr | 2.38 | 2.00 | 3.84 |
| Fe | 4.57 | 7.13 | 17.76 |

Spot analyses show that the protective alumina layer is formed on the surface of the metal substrates. Other metal species (e.g., Cr) from the metal substrate are also present. In general, the alumina protection layers exhibit various morphologies and different penetration depths on the surface of the metal (e.g., AISI441) substrates. The alumina protection layer adheres to the metal substrate and does not spall during thermal cycling and operation.

The present invention can also be used to aluminize metal substrates, parts, and components in other than in-situ applications, e.g., where continuous and protective alumina coatings are needed. Metallic substrates, parts, and components can be of any shape as long as aluminum foil can be applied to the surfaces of interest and a compression load can be delivered through an inert medium such as mica paper. Sources of aluminum can include foils as described herein, or layers deposited by various processes such as, e.g., electroplating.

Applications

The present invention has numerous applications in the production of high-temperature electrochemical devices, as well as applications in manufacturing of coated items idea with uses in a wide range of high-tech industrial manufacturing processes. The following Example provides a further understanding of the invention.

EXAMPLE

In-Situ Aluminization of Alloy Substrates

The compression assembly of FIG. 1 was used. Aluminum foil of a thickness less than 25 um (microns) was sandwiched between a flat metal plate composed of, e.g., AISI441 steel (dimensions: 2"×2"×0.04") and a sheet of mica (e.g., 0.012" thickness). The compression assembly was first fired in air to 550° C. for 2 hours to burn off organic binders in the mica sheet. Then, the compression assembly was heated to an elevated temperature of 900° C. for 2 hours to aluminize the metal substrate.

While exemplary embodiments of the present invention have been shown and described, it will be apparent to those skilled in the art that many changes and modifications may be made without departing from the invention in its true scope and broader aspects. The appended claims are therefore intended to cover all such changes and modifications as fall within the scope of the invention.

What is claimed is:

1. A method for aluminizing a metal-containing substrate, the method comprising:
    compressing an aluminum foil of a selected thickness between one or more metal-containing substrates and a refractory material of a selected thickness with at least one compression component under a selected compression load while heating the aluminum foil and the metal-containing substrate in an oxidizing gas at a selected temperature for a time sufficient to form an aluminum oxide coating layer on a surface of the one or more metal-containing substrates.

2. The method of claim 1, wherein the process is performed on one or more metal-containing substrates of an electrochemical device selected from interconnects, cell frames, or combinations thereof prior to assembly in the electrochemical device.

3. The method of claim 1, wherein the process is performed on one or more metal-containing substrates within an assembled device in-situ.

4. The method of claim 1, wherein the process is performed on one or more metal-containing substrates within a stack assembly of an electrochemical device in-situ.

5. The method of claim 1, wherein the compression load is greater than or equal to about 6800 Newtons/$m^2$.

6. The method of claim 1, wherein the compression load is applied at the selected temperature for a time greater than or equal to about 5 minutes.

7. The method of claim 1, wherein the selected temperature is a temperature between about 660° C. and about 1200° C.

8. The method of claim 1, wherein the heating is performed in a furnace or a heater.

9. The method of claim 1, wherein the heating includes heating the metal-containing substrate to the selected temperature at a selected heating rate between about 1° C. per minute and about 10° C. per minute.

10. The method of claim 1, wherein the heating includes diffusing aluminum from the aluminum foil into the surface of the metal-containing substrate.

11. The method of claim 1, wherein the aluminum foil includes a thickness between about 0.001 mm and about 0.5 mm.

12. The method of claim 1, wherein the process is performed absent annealing at a selected temperature.

13. The method of claim 1, wherein the aluminum oxide coating layer does not spall from the surface of the one or more metal-containing substrates in a device during operation at an operating temperature.

14. The method of claim 1, wherein the aluminum oxide layer reduces release of volatile metals from the one or more metal-containing substrates in a device during operation at an operation temperature compared to metal-containing substrates absent the aluminum oxide layer.

* * * * *